United States Patent
Schumann et al.

(10) Patent No.: US 11,788,422 B2
(45) Date of Patent: Oct. 17, 2023

(54) TWO-LAYER ABRASIVE COATING FOR ROTOR-BLADE TIPS, METHOD, COMPONENT, AND TURBINE ASSEMBLY

(71) Applicant: Siemens Energy Global GmbH & Co. KG, Bayern (DE)

(72) Inventors: Eckart Schumann, Berlin (DE); Britta Stöhr, Berlin (DE); Arturo Flores Renteria, Berlin (DE); Francis Ladru, Berlin (DE); Thorsten Schulz, Berlin (DE); Adrian Wollnik, Dallgow-Döberitz (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 158 days.

(21) Appl. No.: 17/434,751

(22) PCT Filed: Feb. 13, 2020

(86) PCT No.: PCT/EP2020/053731
§ 371 (c)(1),
(2) Date: Aug. 29, 2021

(87) PCT Pub. No.: WO2020/177999
PCT Pub. Date: Sep. 10, 2020

(65) Prior Publication Data
US 2022/0170378 A1  Jun. 2, 2022

(30) Foreign Application Priority Data
Mar. 5, 2019 (DE) ................... 10 2019 202 926.4

(51) Int. Cl.
*B23K 1/19* (2006.01)
*F01D 5/28* (2006.01)
(Continued)

(52) U.S. Cl.
CPC ............ *F01D 5/288* (2013.01); *B23K 1/0018* (2013.01); *B23K 1/19* (2013.01);
(Continued)

(58) Field of Classification Search
CPC ......... F01D 5/288; B23K 1/0018; B23K 1/19; B23K 2103/26; B23K 2101/001;
(Continued)

(56) References Cited

U.S. PATENT DOCUMENTS 3,615,309 A * 10/1971 Dawson ................. B23D 65/00
51/293
4,228,214 A * 10/1980 Steigelman ........ B23K 35/0244
428/339
(Continued)

FOREIGN PATENT DOCUMENTS

DE  102015203579 A1  9/2016
EP  1967313 A1  9/2008
(Continued)

OTHER PUBLICATIONS

PCT International Search Report and Written Opinion of International Searching Authority dated Jun. 2, 2020 corresponding to PCT International Application No. PCT/EP2020/053731 filed Feb. 13, 2020.

*Primary Examiner* — David E Sosnowski
*Assistant Examiner* — Theodore C Ribadeneyra
(74) *Attorney, Agent, or Firm* — WOLTER VAN DYKE DAVIS, PLLC

(57) ABSTRACT

An excellent abrasive blade tip is provided by a two-layer coating system consisting of a brazing solder coating and an NiCoCrAlY coating containing cBN (cubic Boron Nitride).

19 Claims, 1 Drawing Sheet

(51) Int. Cl.
*B23K 1/00* (2006.01)
*B23K 103/18* (2006.01)
*B23K 101/00* (2006.01)

(52) U.S. Cl.
CPC .... *B23K 2101/001* (2018.08); *B23K 2103/26* (2018.08); *F05D 2220/32* (2013.01); *F05D 2230/31* (2013.01); *F05D 2230/90* (2013.01); *F05D 2240/30* (2013.01); *F05D 2300/177* (2013.01)

(58) Field of Classification Search
CPC ............. F05D 2220/32; F05D 2230/31; F05D 2230/90; F05D 2240/30; F05D 2300/177
See application file for complete search history.

(56) References Cited

U.S. PATENT DOCUMENTS

| | | | | |
|---|---|---|---|---|
| 5,161,335 | A * | 11/1992 | Tank | B24D 18/00 |
| | | | | 175/426 |
| 5,957,365 | A * | 9/1999 | Anthon | B23K 35/327 |
| | | | | 219/146.51 |
| 6,190,124 | B1 * | 2/2001 | Freling | C23C 28/3215 |
| | | | | 415/174.4 |
| 6,811,898 | B2 * | 11/2004 | Ohara | C23C 6/00 |
| | | | | 428/697 |
| 9,322,100 | B2 * | 4/2016 | Manier | C23C 30/00 |
| 10,018,056 | B2 * | 7/2018 | Stratton | B23K 35/304 |
| 10,030,527 | B2 | 7/2018 | Stratton et al. | |
| 10,060,273 | B2 * | 8/2018 | Strock | C23C 30/00 |
| 10,259,720 | B2 * | 4/2019 | Balbach | C09D 1/00 |
| 10,654,137 | B2 * | 5/2020 | Daniels | F01D 5/005 |
| 10,786,875 | B2 * | 9/2020 | Stratton | B23K 26/38 |
| 2003/0132119 | A1 * | 7/2003 | Ohara | F01D 11/122 |
| | | | | 205/192 |
| 2004/0091627 | A1 | 5/2004 | Ohara et al. | |
| 2006/0078674 | A1 | 4/2006 | Ohara | |
| 2008/0166225 | A1 * | 7/2008 | Strangman | F01D 11/122 |
| | | | | 415/173.4 |
| 2010/0119859 | A1 | 5/2010 | Manier et al. | |
| 2010/0322780 | A1 * | 12/2010 | Manier | C22C 19/05 |
| | | | | 228/56.3 |
| 2011/0244770 | A1 * | 10/2011 | Boutaghou | C09K 3/1454 |
| | | | | 51/307 |
| 2012/0063911 | A1 | 3/2012 | Bossmann et al. | |
| 2015/0360311 | A1 * | 12/2015 | Zheng | C22C 29/14 |
| | | | | 228/122.1 |
| 2016/0003066 | A1 | 1/2016 | Stratton et al. | |
| 2017/0044911 | A1 * | 2/2017 | Stratton | B23K 35/327 |

FOREIGN PATENT DOCUMENTS

| | | | | |
|---|---|---|---|---|
| EP | 2171124 | B1 | 9/2011 | |
| EP | 2860231 | A1 * | 4/2015 | ........... B23K 1/0018 |
| EP | 2860231 | A1 | 4/2015 | |

* cited by examiner

TWO-LAYER ABRASIVE COATING FOR ROTOR-BLADE TIPS, METHOD, COMPONENT, AND TURBINE ASSEMBLY

CROSS REFERENCE TO RELATED APPLICATIONS

This application is the US National Stage of International Application No. PCT/EP2020/053731 filed 13 Feb. 2020, and claims the benefit thereof. The International Application claims the benefit of German Application No. DE 10 2019 202 926.4 filed 5 Mar. 2019. All of the applications are incorporated by reference herein in their entirety.

FIELD OF INVENTION

The invention relates to the application of a two-layer abrasive coating by means of various materials, a component and a turbine assembly.

BACKGROUND OF INVENTION

Rotor blade tips as illustrative component are subjected to extreme abrasive stresses during the bedding process when first starting up the turbine. This leads to the coating on the rotor blade tip being worn away after a very short time and the blades no longer being protected against oxidation or corrosion. The oxidation- and corrosion-related damage, which leads to an undesirably large gap between the rotor blades and the housing, is equally pronounced. One possible way of improving the situation is application of wear-resistant coatings to the blade tip in combination with an abradable coating of the ring segments which is then designed so that it is abraded away easily when starting up the turbine. This structure would allow controlled bedding-in of the rotor blades into a stator coating which is at least partly present. However, no wear-resistant coating has hitherto been developed for the tip.

Blades are also often provided with a standard layer system comprising MCrAlY and TBC on the tip, but this cannot survive for a long time on the blade because of the above-described processes.

U.S. Pat. No. 10,030,527 B2 discloses the use of three layers, with abrasive particles likewise being present in the outermost layer composed of a solder material.

SUMMARY OF INVENTION

It is therefore an object of the invention to solve the abovementioned problem.

The object is achieved by a process, a component and a turbine assembly as claimed.

Further advantageous measures, which can be combined in any way, for achieving further advantages are listed in the respective dependent claims.

DETAILED DESCRIPTION OF INVENTION

Figure 1:
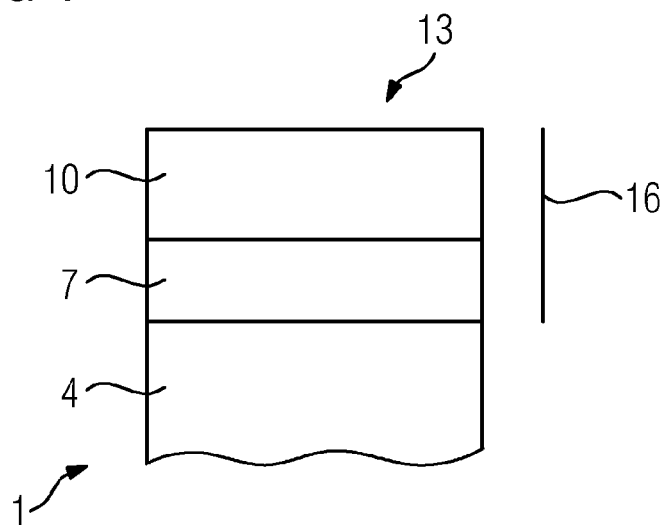
FIG. 1 schematically shows the arrangement on a blade tip and
FIG. 2 shows the arrangement of the abrasive particles.

The description and the figure represent only working examples of the invention.

It is proposed that coatings be applied in the form of layers, in particular tapes comprising particles of cBN (cubic Boron Nitride), in a close-to-contour manner to, in particular, rotor blades.

These tapes ideally consist of two layers: an outer metal layer, in particular an MCrAlY layer, having embedded abrasive particles, in particular cBN particles, sintered to a solder layer for bonding to a substrate.

However, the application of these tapes is associated with the problem of manufacturing sequence. If the tapes are soldered onto the previously coated blades, the coatings can be impaired during soldering at temperatures above 1473K (diffusion of aluminum into the base material, coarsening of the β-phase, Kirkendal porosity, etc.). This leads to an impaired oxidation protection action and possibly to spalling of the NiCoCrAlY. For this reason, the cBN tape should be applied before the layer system composed of NiCoCrAlY and TBC (Thermal Barrier Coating) for the turbine blade. However, masking in the region of the tip is difficult, so that a NiCoCrAlY layer of 300 µm is applied to the cBN tapes. It is expected that this will be abraded away quickly at high temperatures during the bedding-in process because of the superplastic properties of the NiCoCrAlY and the cBN particles underneath will be exposed.

However, overspray of TBC onto the tips cannot be completely prevented. It is thus desirable for the TBC to adhere very poorly to the NiCoCrAlY, so that it can be removed again very easily after coating on the cBN tapes at the tip. For this purpose, prior polishing of the tip is proposed; in contrast to the roughening which is otherwise normally carried out, this leads to poor adhesion between MCrAlY and TBC.

It is advantageously sufficient for not all, in particular at least 10% or at least 20% and not more than 80%, of the rotor blades to receive a cBN tape in order to ensure controlled bedding-in. The manufacturing process or the order which provides for combined application of the tapes during the solution heat treatment and the polishing of the NiCoCrAlY coating in the region of the tips is likewise completely new.

Further general advantages of the cBN tapes are: —increased life of the rotor blades due to less wear at the tip, —as a result, increased life.

The bottom layer consists of a coating composed of a high-temperature solder, in particular DF-4B, Ni660 or BRB.

The solder has a melting point which is at least 10K lower, in particular at least 20K lower, than that of the material of the substrate and/or the material of the second, outer layer.

The abrasive particles, in particular the cBN particles, are embedded in the outer, second layer, in particular an NiCoCrAlY layer. The two-layer tape can be sintered together with the cBN particles in a close-to-contour manner and be applied directly to the tips of the rotor blades.

The abrasive particles advantageously project from the outer layer; in particular, they are present in the matrix in an amount of at least 50% or form the major part of the matrix.

Depending on the base material of the substrate, the solder is selected so that the soldering-on of the cBN tapes can be carried out together with the solution heat treatment of the blade.

The total tape has a thickness in the range 0.1 mm-0.7 mm.

The cBN particles advantageously have a diameter in the range 50 µm-200 µm.

The solder layer should be made very thin so that the impairment of the base material by inward diffusion of the melting point lowerer from the solder (boron [B]/silicon [Si]) can be minimized as far as possible.

Due to the two-layer structure of the tapes, the abrasive particles, in particular the cBN particles, can be kept in position during soldering. Furthermore, the NiCoCrAlY layer functions as additional sink for the melting point lowerer and offers additional protection against oxidation.

The two-layer structure of the cBN tapes comprising NiCoCrAlY and typical high-temperature solders is likewise entirely new. It is expected that armoring of the tips will make it possible to increase the efficiency by 0.4%.

FIG. 1 schematically shows an arrangement 1 of a blade tip 13 of a substrate 4, in particular a rotor blade 4 of a turbine, in particular a gas turbine.

The substrate 4 is advantageously metallic and in particular a nickel- or cobalt-based alloy.

It can also be a substrate 4 composed of CMC.

On the blade tip 13 and the outer end, a solder layer 7 is present as one layer, and as outermost second coating 10 as further layer there is a layer of a metallic matrix material, in particular an NiCoCrAlY alloy or an NiCoCrAlY alloy, which comprises abrasive particles, in particular particles of cubic boron nitride (cBN).

Figure 2:
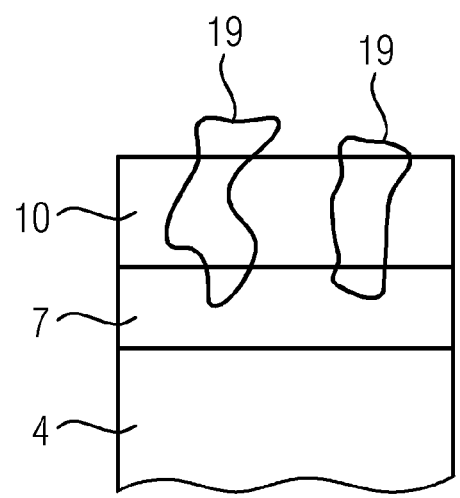

The abrasive particles 19 can be present in the solder layer 7 or are at most partly present in the solder layer 7 (FIG. 2).

Before the component is coated with a further NiCoCrAlY layer, a solution heat treatment of the substrate advantageously takes place at from 1477K to 1516K for, in particular, from 1 hour to 4 hours as soldering process.

An annealing heat treatment up to >1365K advantageously takes place after the soldering process and before coating with NiCoCrAlY, in particular for 4 hours.

Coating with NiCoCrAlY is advantageously followed by a bonding heat treatment which takes place at, in particular, from ≥1350K to ≤1360K for from 1 hour to 6 hours.

After the NiCoCrAlY bonding heat treatment, a further second annealing heat treatment advantageously takes place at ≤1145K, in particular for 24 hours.

NiCoCrAlY can also comprise further elements such as rhenium (Re), silicon (Si), tantalum (Ta) or iron (Fe).

The invention claimed is:

1. A process for producing an abrasive coating on a substrate, or on a blade tip of a rotor blade, the process comprising:
applying two layers for the abrasive coating, namely a bottom solder layer and an outer, second layer of a coating comprising abrasive particles as tapes, to the substrate, and
joining the bottom solder layer to the substrate by a soldering process, as a result of which the outer, second layer is also bonded-on,
where a material of the bottom solder layer has a melting point which is at least 10K lower than that of a material of the substrate, and also has a melting point which is at least 10K lower than that of a material of the outer, second layer, and
wherein the abrasive particles are present in the outer, second layer and partly in the bottom solder layer.

2. The process as claimed in claim 1,
wherein the outer, second layer comprising the abrasive particles comprises NiCoCrAlY or a nickel or cobalt-based alloy as matrix material.

3. The process as claimed in claim 1,
wherein the abrasive coating is firstly applied and soldered, a remaining area of the rotor blade is then coated with a NiCoCrAlY-based alloy.

4. The process as claimed in claim 1,
wherein the soldering of the bottom solder layer occurs during a solution heat treatment of the substrate.

5. The process as claimed in claim 4,
wherein the solution heat treatment of the substrate takes place at from 1477K to 1516K for from 1 hour to 4 hours.

6. The process as claimed in claim 5,
wherein a first annealing heat treatment up to ≥365K for 4 hours, takes place after the soldering process and before coating with NiCoCrAlY.

7. The process as claimed in claim 6,
wherein a bonding heat treatment, from ≥350K to ≤1360K, for from 1 hour to 6 hours, takes place after coating with the NiCoCrAlY.

8. The process as claimed in claim 7,
wherein a second annealing heat treatment ≤1145K for 24 hours, takes place after the NiCoCrAlY bonding heat treatment.

9. The process as claimed in claim 1,
wherein the two layers together comprise a thickness in a range from 0.1 mm to 0.7 mm.

10. The process as claimed in claim 1,
wherein the abrasive particles, comprise -cBN particles, and have a diameter in a range from 50 μm to 200 μm.

11. The process as claimed in claim 1,
where the material of the bottom solder layer has a melting point which is at least 20K lower, than that of the material of the substrate, and also has a melting point which is at least 20K lower, than that of the material of the outer, second layer.

12. A component, comprising:
an abrasive coating on a substrate composed of a nickel or cobalt-based superalloy, wherein a bottom solder layer is present on the substrate, and
an outer, second layer comprising abrasive particles,
where a material of the bottom solder layer has a melting point which is at least 10K lower than that of a material of the substrate, and also has a melting point which is at least 10K lower than that of a material of the outer, second layer, and
wherein the abrasive particles are present in the outer, second layer and partly in the bottom solder layer.

13. The component as claimed in claim 12,
wherein the abrasive particles project from the outer, second layer to an extent of not more than 50%.

14. A turbine assembly, comprising:
at least one rotor blade row comprising rotor blades,
wherein the rotor blades are configured like the component as claimed in claim 12 at a blade tip.

15. The turbine assembly as claimed in claim 14,
wherein only part of the rotor blades of the least one rotor blade row comprise the abrasive coating.

16. The component as claimed in claim 12,
wherein the outer, second layer comprising the abrasive particles comprises NiCoCrAlY or a nickel or cobalt-based alloy as matrix material.

17. The component as claimed in claim 12,
wherein the two layers together comprise a thickness in a range from 0.1 mm to 0.7 mm.

18. The component as claimed in claim 12,
wherein the abrasive particles comprise cBN particles, and have a diameter in a range from 50 μm to 200 μm.

19. The component as claimed in claim 12, where the material of the bottom solder layer has a melting point which is at least 20K lower, than that of the material of the substrate, and also has a melting point which is at least 20K lower, than that of the material of the outer, second layer.

* * * * *